United States Patent [19]

Olschewski et al.

[11] 4,443,210

[45] Apr. 17, 1984

[54] TENSION ROLLER FOR BELT DRIVES

[75] Inventors: Armin Olschewski, Schweinfurt; Manfred Brandenstein, Eussenheim; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 268,886

[22] Filed: Jun. 1, 1981

[30] Foreign Application Priority Data

Jun. 27, 1980 [DE] Fed. Rep. of Germany ... 8017101[U]

[51] Int. Cl.³ .................. F16H 55/42; F16H 7/18; F16H 7/12
[52] U.S. Cl. .................... 474/199; 474/112; 474/902
[58] Field of Search ............... 474/112, 165, 198, 199, 474/902

[56] References Cited

U.S. PATENT DOCUMENTS

| | | | |
|---|---|---|---|
| 2,137,987 | 11/1938 | Smith | 474/199 |
| 2,192,147 | 2/1940 | Notting | 474/199 |
| 2,546,782 | 3/1951 | Rives | 474/199 |
| 2,631,474 | 3/1953 | Skovera | 474/199 |
| 2,669,878 | 2/1954 | Nelson | 474/199 |
| 3,144,198 | 8/1964 | Debray | 474/112 |

Primary Examiner—Lawrence J. Staar
Assistant Examiner—Michael D. Bednarek
Attorney, Agent, or Firm—Daniel M. Rosen

[57] ABSTRACT

A tension roller for belt drives comprises a pin designed as a hollow member and a roller member supported on the pin by way of a rolling bearing, with an inner ring, rolling means and an outer ring supporting the roller member. The pin is formed by two thin-walled sleeves positioned at opposite ends of the bore of the inner ring and the rolling bearing. At least one of the sleeves is provided on the surface thereof with a radial shoulder for emplacement of the inner ring.

13 Claims, 2 Drawing Figures

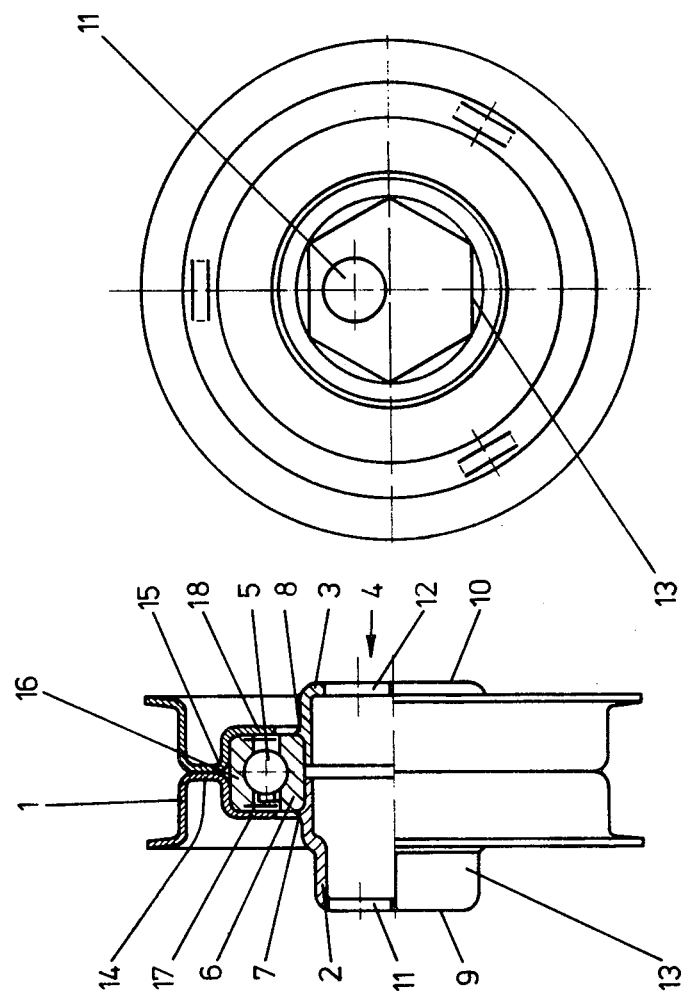

TENSION ROLLER FOR BELT DRIVES

BACKGROUND OF THE INVENTION

The present invention relates to tension rollers and particularly to a tension roller for a belt drive. The tension roller is a pin designed as a hollow member having a rolling member supported thereon by way of a rolling bearing.

DESCRIPTION OF THE PRIOR ART

Prior art tension rollers have employed pins which form the inner bearing part of a rolling bearing. The pin is detachably fastened to a machine part by means of an eccentrically displaced screw penetrating the pin and is eccentrically displaceable by turning the screw against working surfaces, such as key faces containing the adjusting member, by turning about the screw. The pin itself is formed of a hollow member having guide elements at one or both ends with eccentrically displaced bores which are connected securely against twisting, as described in German Utility patent No. 7,328,570.

In such known embodiments, the hollow member surface is formed as an inner race for accommodating a rolling member for a bearing. This results in a high manufacturing cost, especially with regard to heat treatment, since races for such bearing members must as a rule be hardened. In such case, the pin designed as a hollow member further consists of a cylindrical sleeve or bushing, into the bore of which is inserted a disk or like part, provided with a key face and an eccentrically displaced bore. To fix the disk in the mounting position, the disk is provided with a plane surface which cooperates with a suitably designed opposing face in the bushing. The requirements for shaping the disk and related components are extreme in form in such known embodiments and cannot therefore be simply manufactured by non-cutting means.

It is therefore the object of the present invention to simplify the manufacture of the tension roller, and in particular of the pin components, and to facilitate the assembly of the separate parts.

BRIEF DESCRIPTION OF THE INVENTION

The foregoing object is accomplished according to the present invention in that the pin is formed by two thinwalled sleeves which are inserted from both ends into the bore of the inner ring of a rolling bearing. At least one of the sleeves is provided at its surface with a radial shoulder for emplacement on the inner ring. The shoulder may at the same time be designed to run all the way around, but it is alternatively possible to provide only separate shoulder sections distributed on the periphery of the sleeve.

A standard rolling bearing may be used in this embodiment, so that special heat treatment processes for the pin of the tension roller may be avoided. The thinwalled sleeves forming the pin are centered to each other above the bore of the inner ring of the rolling bearing, without any special centering surfaces or the like having to be provided in the individual parts of the pin. The axial position of the two sleeves of the pin relative to each other is established by the radial shoulders provided on the surface of the sleeves. These sleeves may be manufactured without cutting in a particularly simple fashion by deep-drawing or extrusion molding, such processes being sufficiently accurate so that no additional operations are required. The radial shoulders or shoulder sections may be formed immediately at this point, or may be formed subsequently by working of the material or the like.

According to an additional feature of the invention, the two sleeves are provided at one end with bases having guide surfaces for a fastening element. These guide surfaces are bores eccentric to the center shaft of the pin, through which bores a fastening screw or the like is passed. The sleeves, provided with bases, may then be inserted into the inner ring of the rolling bearing such that the bases of the two sleeves face one another or are arranged pointing away from each other.

To be able to displace the pin about the screw by turning, according to a further feature of the invention, one of the sleeves on the end projecting over the rolling bearing laterally is provided with a working surface for an adjusting key. This working surface may be designed in simple fashion as a polygon and be formed by deep-drawing or extrusion molding of this sleeve. In so doing, it is possible to provide this working surface on the surfaces of the sleeve or on an offset end section of the sleeve.

According to further feature of the invention, the base of one sleeve may be provided with one or a plurality of bores or recesses serving for receiving the insert keys effecting displacement of the pin. These bores may be provided instead of or in addition to the working surfaces on the end projecting laterally over the rolling bearing.

An example of the invention is described in greater detail below, taken in conjunction with the appended drawings.

DESCRIPTION OF THE FIGURES

FIG. 1 shows a tension roller in section, and
FIG. 2 shows a tension roller of FIG. 1 in side view.

DESCRIPTION OF THE PREFERRED EMBODIMENT

A tension roller is shown, comprising the roller member 1, the pin 4 composed of the two sleeves 2 and 3, and the rolling bearing 5 arranged between roller member 1 and pin 4. The two sleeves 2 and 3 are shoved from the side into the bore of the inner ring 6 of the rolling bearing far enough until the radial shoulders 7 and 8 provided on the surface of the sleeves 2 and 3 are emplaced on the side surfaces of the inner ring 6. These radial shoulders 7 and 8 may be formed by projections running all the way around and projecting radially outward or by separate projections distributed on the periphery. Each sleeve 2 or 3 is provided at one end with a base 9 or 10, each of which has an eccentric bore 11 or 12 for a screw (not shown) penetrating the pin 4, for the detachable fastening of the tension roller to a machine part. The sleeve 2, at the end projecting beyond the rolling bearing 5, is in addition provided with a working surface 13 for an adjusting key. This working surface 13 is in the present example designed as a hexagon formed on the surface of the sleeve.

The two sleeves 2 and 3 forming the pin 4 may be connected with the inner ring 6 of the rolling bearing by force fit, but it is alternatively possible to connect the sleeves 2 and 3 with the inner ring of the rolling bearing by welding, bonding or the like.

The roller member 1 is formed of two identical parts 14 and 15 of sheet metal, which are mounted on the surfaces of the outer ring 16 of the rolling bearing 5.

The two sheet metal parts 14 and 15 may be joined in known fashion by riveting, welding, bonding, caulking or the like. Each sheet metal part 14 and 15 is provided at the inner edge with an annular flange 17 or 18 pointing inward, both of which reach into the vicinity of the inner ring 6 of the rolling bearing and form a split seal or the like with the latter.

Variations and modifications within the spirit and scope of the present invention, as defined by the claims, will be apparent to those skilled in the art.

What is claimed is:

1. A tension roller for belt drives, comprising a hollow pin and a roller member supported on said pin by way of a rolling bearing, said rolling bearing having an inner ring, rolling means, and an outer ring, said roller member being supported on said outer ring, said pin being comprised of two thinwalled sleeves inserted in opposite ends of the bore of said inner ring of said rolling bearing, at least one of said sleeves being provided on the surface thereof with a radial shoulder for emplacement by contact with said inner ring.

2. The tension roller of claim 1, wherein said radial shoulder is continuous about the periphery of said one of said sleeves.

3. The tension roller of claim 1, wherein said radial shoulder is formed of a plurality of sections distributed on the periphery of said one of said sleeves.

4. The tension roller of claim 1, wherein each of said sleeves is provided at one end thereof with a base having guide surfaces for a fastening element.

5. The tension roller of claim 1, wherein one of said sleeves has an end projecting laterally beyond said rolling bearing, said end being provided with a working surface adapted to receive an adjusting key.

6. The tension roller of claim 5, wherein the cross section of said working surface is shaped as a polygon.

7. The tension roller of claim 4, wherein the base of at least one of said sleeves is provided with means for receiving adjusting tools.

8. The tension roller of claim 7, wherein said means for receiving adjusting tools is defined by aperture forming sleeve walls.

9. The tension roller of claim 6, wherein said polygon is regular.

10. The tension roller of claim 9, wherein said regular polygon is a hexagon.

11. The tension roller of claim 9, wherein said working surface comprises a predetermined number of planar faces lying substantially parallel to the axis of symmetry of said roller member.

12. The tension roller of claim 5, wherein said end is offset relative to that portion of said sleeve having said end which is inserted into the bore of said inner ring.

13. The tension roller of claim 9, wherein said axis of symmetry of said working surface substantially coincides with the axis of symmetry of said roller member.

* * * * *